United States Patent [19]

Tamaru

[11] Patent Number: 5,639,570
[45] Date of Patent: Jun. 17, 1997

[54] CELL COVER FOR AN ELECTRONIC APPARATUS

[75] Inventor: Toshiyuki Tamaru, Tokyo, Japan

[73] Assignee: NEC Corporation, Tokyo, Japan

[21] Appl. No.: 661,984

[22] Filed: Jun. 12, 1996

[30] Foreign Application Priority Data

Jun. 16, 1995 [JP] Japan .................... 7-174516

[51] Int. Cl.$^6$ ...................................... H01M 2/10
[52] U.S. Cl. ................................ 429/97; 429/100
[58] Field of Search .................... 429/97.1, 96, 98; 455/347, 348; 292/300, 302; 361/600

[56] References Cited

U.S. PATENT DOCUMENTS

| | | | |
|---|---|---|---|
| 4,977,042 | 12/1990 | Chiyajo et al. | 429/100 X |
| 5,135,822 | 8/1992 | Okamoto | 429/97 |
| 5,244,755 | 9/1993 | Benoist et al. | 429/97 |
| 5,337,215 | 8/1994 | Sunderland et al. | 429/97 X |
| 5,508,124 | 4/1996 | Gordecki et al. | 429/97 |

*Primary Examiner*—Anthony Skapars
*Attorney, Agent, or Firm*—Scully, Scott, Murphy & Presser

[57] ABSTRACT

An electronic apparatus of the invention comprises a case 10 which has a cell storing part 11 and has an engaging groove 11a formed in a side wall of an opening of the cell storing part as well as an engaging hollow 11b formed near the opening. A cell cover 20 having an engaging claw 21 formed is engaged with the engaging groove of the cell holding part. A locking plate which is a flexible plate-shaped member is fixed to the cell cover in its one end and is made free in the other end. When the cell cover is fitted onto the cell storing part, this locking plate is engaged with the engaging hollow 11b in its free end. By such a simple construction as this, it is possible to simply and securely lock the cell cover as well as to reduce the number of components and shorten the assembling time.

4 Claims, 6 Drawing Sheets

CELL COVER FOR AN ELECTRONIC APPARATUS

BACKGROUND OF THE INVENTION

1. Field of the Invention

The present invention relates to an electronic apparatus driven by an electric cell or battery, and particularly to an electronic apparatus having a simply-composed cell cover.

2. Related Art

At present, a small-sized electronic apparatus such as a selective calling receiver, a headphone stereophonic apparatus, a remote control apparatus of a television receiver, or the like which is driven by an electric cell or battery is widespread. In such an electronic apparatus, a construction for attaching and detaching its cell cover is devised so as to make it possible to easily change an electric cell.

In such an existing electronic apparatus, a cell cover is fitted onto a cell storing part by sliding the cell cover in the longitudinal direction as engaging an engaging claw with an engaging groove of its case. And then the cell cover is locked by sliding a sliding plate to engage it with an engaging hollow.

However, since the above-mentioned existing electronic apparatus has, as components separate from the cell cover, a sliding plate for locking the cell cover and a stopper for holding the sliding plate so as to be freely slid, it has a problem that the cell cover cannot be simply and easily locked due to an increase of the number of components and its complicated construction.

SUMMARY OF THE INVENTION

The present invention has been made in consideration of the above-mentioned problem, and an object of the invention is to provide an electronic apparatus in which it is possible to reduce the number of components and shorten the assembling time.

In order to attain the above-mentioned object, an electronic apparatus of the invention comprises a case which has a cell storing part and has an engaging groove formed in a side wall of an opening of the cell storing part as well as an engaging hollow formed near the opening. A cell cover having an engaging claw formed is engaged with the engaging groove of the cell storing part. A locking plate which is a flexible plate-shaped member is fixed to the cell cover in its one end and is free in the other end. When the cell cover is fitted onto the cell storing part, this locking plate is engaged with the engaging hollow in its free end.

The locking plate is preferably made of an elastomer resin and a hollow is formed in the reverse side of its free end.

In an electronic apparatus of the invention as composed above, the cell cover is fitted onto the cell storing part by sliding the cell cover as engaging the engaging claw with the engaging groove of the case in a state where the locking plate is bent outside in its free end. And then the cell cover is locked by releasing the free end of the locking plate to come into a free state to engage it with the engaging hollow.

In this way, it is possible to simply and securely lock the cell cover as well as to reduce the number of components.

BRIEF DESCRIPTION OF THE DRAWINGS

The above and other objects, features and advantages of the present invention will become apparent from the following detailed description when taken with the accompanying drawings in which.

In the drawings, identical reference numerals denote identical structural elements.

DETAILED DESCRIPTION OF THE PREFERRED EMBODIMENTS

Embodiments of an electronic apparatus according to the present invention are described in the following with reference to the drawings.

Figure 1:
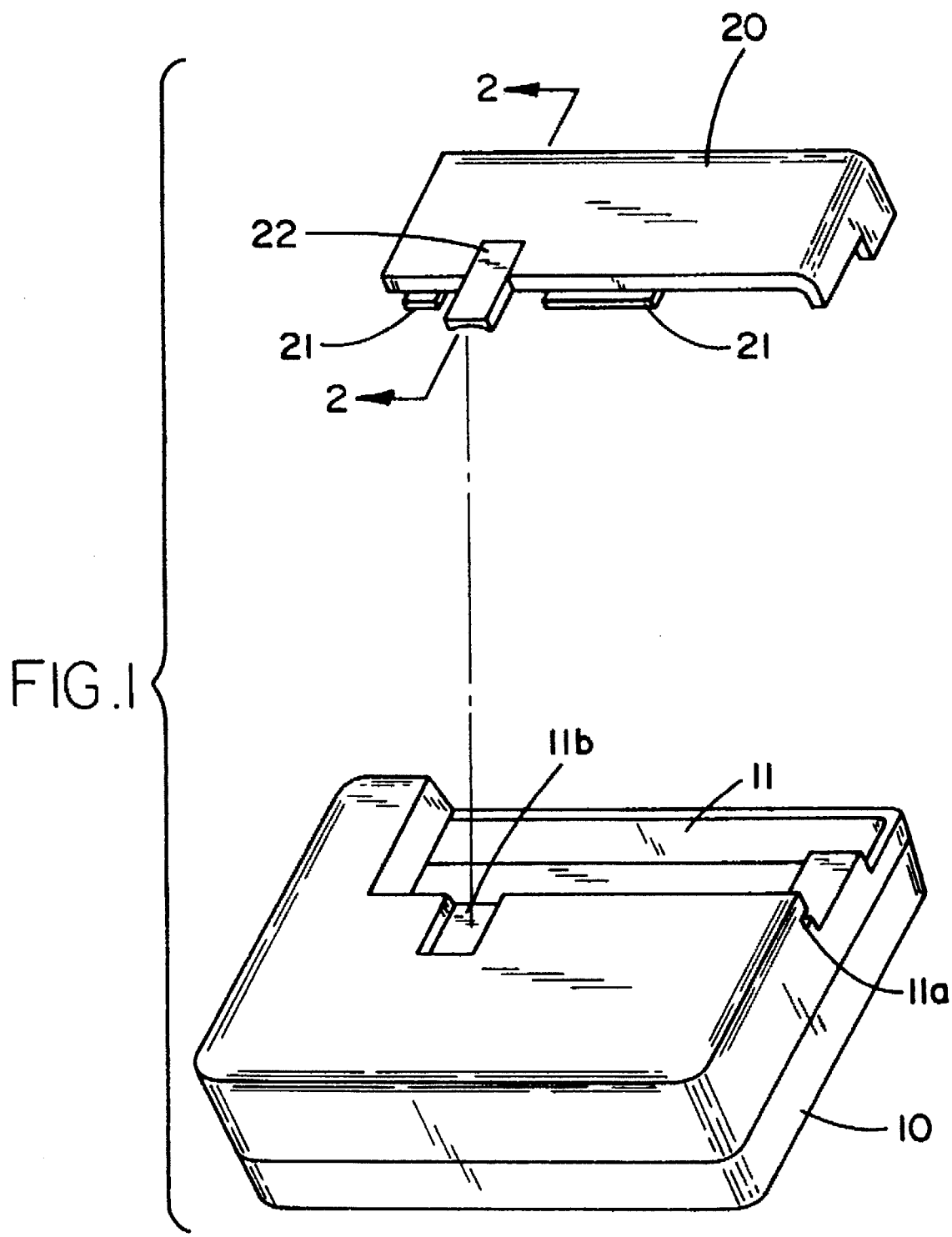
FIG. 1 is a perspective view showing an electronic apparatus according to an embodiment of the invention.
Figure 2:
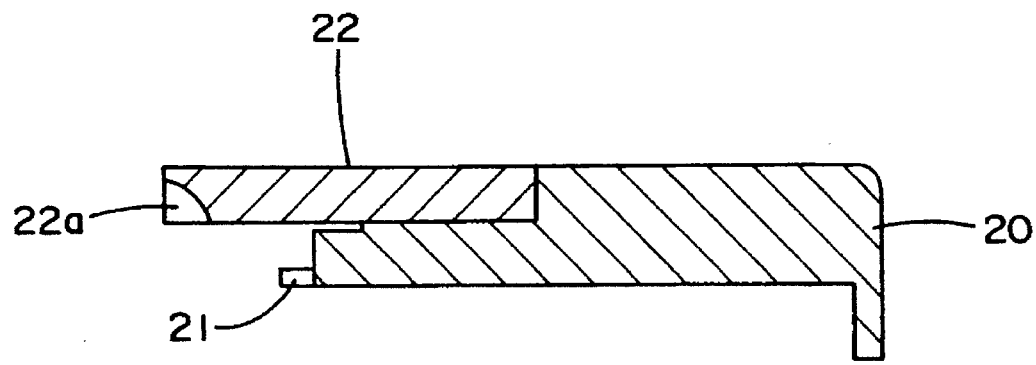
FIG. 2 is a sectional view taken along line A—A of a cell cover of the electronic apparatus.

In FIG. 1, a cell storing part 11 is provided in the reverse side of a case 10. In a side wall of an opening of the cell storing part 11, an engaging groove 11a is formed in its longitudinal direction as well as an engaging hollow 11b is formed so as to be continuous with the opening.

Figure 3:
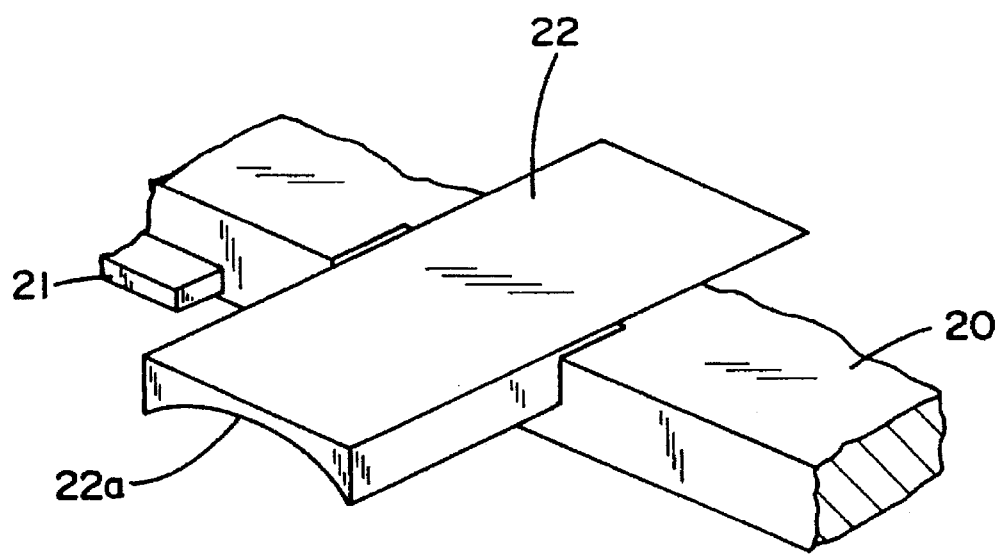
FIG. 3 is a perspective view, with portions broken away, of the cell cover.

In FIGS. 1 and 3, a cell cover 20 is made from polycarbonate or ABS (acrylonitril-butadiene-styrene) resin. An engaging claw 21 to engage with the engaging groove 11a as sliding in it is formed in the longitudinal direction of an edge of the cell cover 20, and a locking plate 22 is fixed in one side of the cell cover 20.

This locking plate 22, which is a flexible plate-shaped member made of an elastomer resin, is joined with the cell cover 20 in its one end by means of thermal fusion welding and is free in the other end. The locking plate 22 is composed so that its free end may engage with the engaging hollow 11b when the cell cover is fitted onto the cell storing part 11.

Furthermore, a hollow 22a for engaging with a finger or a nail is formed in the reverse side of the free end of the locking plate 22.

A hard thermoplastic elastomer resin is preferable, and concretely an elastomer resin of polyester or polyurethane system is preferable as an elastomer resin used for forming the locking plate 22.

In this embodiment, a projection length of the locking plate 22 is made shorter than the total length of the engaging hollow 11b. Thanks to such a construction, a gap is made at the front end side of the locking plate 22 when the locking plate 22 is engaged with the engaging hollow 11b (see FIGS. 5A and 5B), and it is possible to easily release the locking plate 22 from an engaging state by bending it through entering a finger or a nail into the gap.

When the cell cover and the locking plate are made, the cell cover is first formed by filling a mold with polycarbonate, and then the locking plate 22 is secondly formed by filling the same mold with hard elastomer resin. Thus, the locking plate 22 is joined with the cell cover 20 by means of thermal fusion welding so as to be formed into one body with the cell cover 20.

Next, operations of attaching and detaching the cell cover of the electronic apparatus as composed in this way are described in the following with reference to FIGS. 4 and 5.

Figure 4A:
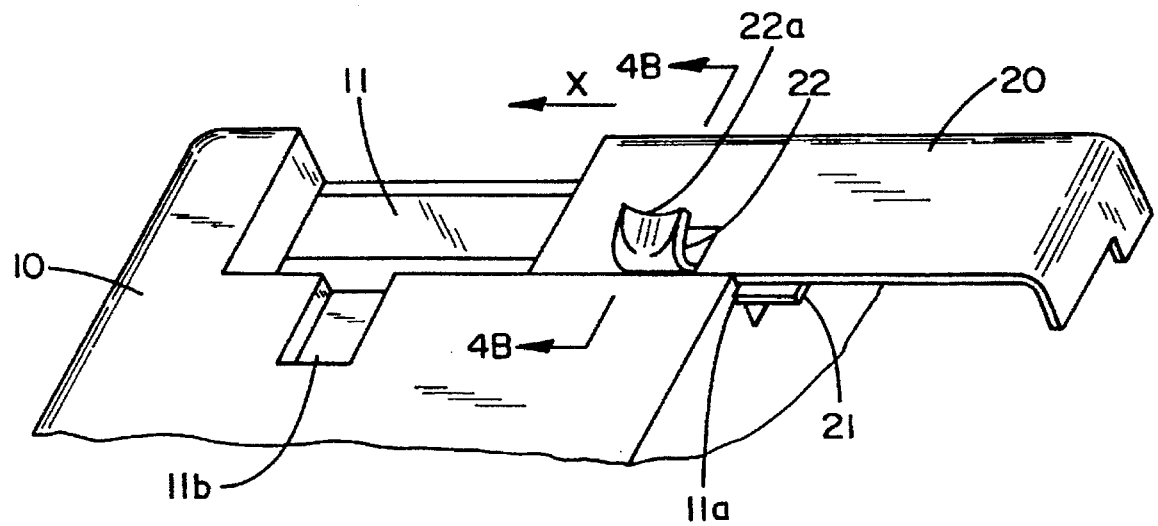
FIG. 4A is a perspective view, with portions broken away, of the cell cover, showing a state where the cell cover is slid.
Figure 4B:
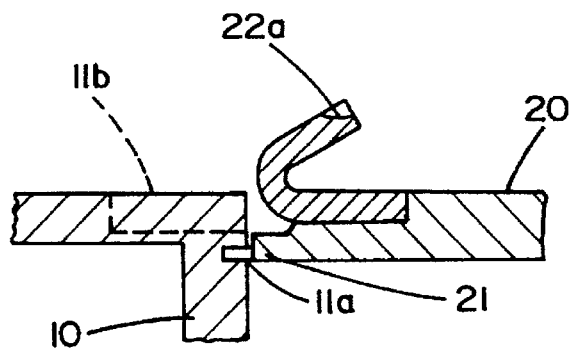
FIG. 4B is a sectional view taken along line B—B in FIG. 4A.

FIG. 4A is a perspective view, with portions broken away, of the cell cover, showing a state where the cell cover is slid, and FIG. 4B is a sectional view taken along line B—B in FIG. 4A. And FIG. 5A is a perspective view showing the electronic apparatus in a state where it is fitted with the cell cover, and FIG. 5B is a sectional view taken along line C—C in FIG. 5A.

When the cell cover 20 is fitted onto the cell storing part 11, as shown in FIGS. 4A and 4B, while the free end of the locking plate 22 is first kept in a state where it is bent outside, the engaging claw 21 is engaged with the engaging groove 11a of the case and the cell cover 20 is slid in the direction of the arrow X. In this manner, the cell cover is fitted onto the cell storing part 11.

Figure 5A:
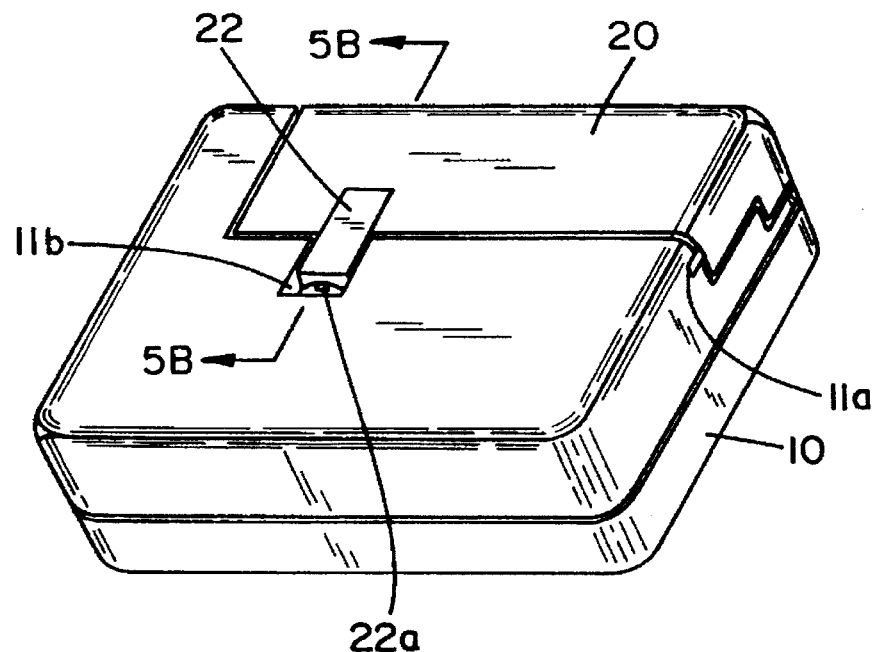
FIG. 5A is a perspective view showing the electronic apparatus in a state where it is fitted with the cell cover.
Figure 5B:
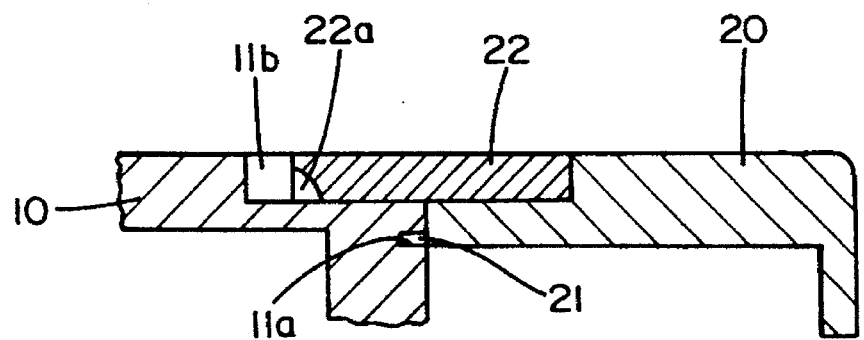
FIG. 5B is a sectional view taken along line C—C in FIG. 5A.

After this, as shown in FIGS. 5A and 5B, the cell cover 20 is locked with the cell storing part 11 by making the free end released to engage with the engaging hollow 11b.

On the other hand, when the cell cover 20 is removed from the cell storing part 11, as shown in FIGS. 5A and 5B, the locking plate 22 is released from engagement with the engaging hollow 11b by bending the free end of the locking plate 20 through entering a finger or a nail into the gap in the front end of the locking plate 22 to engage the finger or the nail with the hollow 22a.

After this, as shown in FIGS. 4A and 4B, the cell cover 20 can be removed from the cell storing part 11 by sliding the cell cover 20 in the direction of the arrow while the free end of the locking plate 22 is kept in a bending state.

According to such an electronic apparatus of this embodiment, since the cell cover 20 and the locking plate 22 can be molded into one body, it is possible to simply and securely lock the cell cover with the locking plate 22 as well as to reduce the number of components and shorten the assembling time.

And thanks to molding the locking plate 22 out of an elastomer resin, since the locking plate can be easily deformed with an external force as well as can be immediately restored to its original form by removing this external force, it is possible to make the locking plate 22 more effectively function.

Furthermore, by molding the locking plate 22 out of an elastomer resin, the locking plate can be firmly joined with the cell cover formed out of polycarbonate, and thanks to use of a hard elastomer resin the locking plate 22 is made moderately hard and can securely lock the cell cover 20 as preventing the locking plate 22 from being bent due to vibration, shock, and the like.

Still further, by forming the hollow 22a in the reverse side of the free end of the locking plate 22, it is possible to easily bend the locking plate 22 in an engaging state and easily release the locking plate 22 from the engaging state.

Figure 6A:
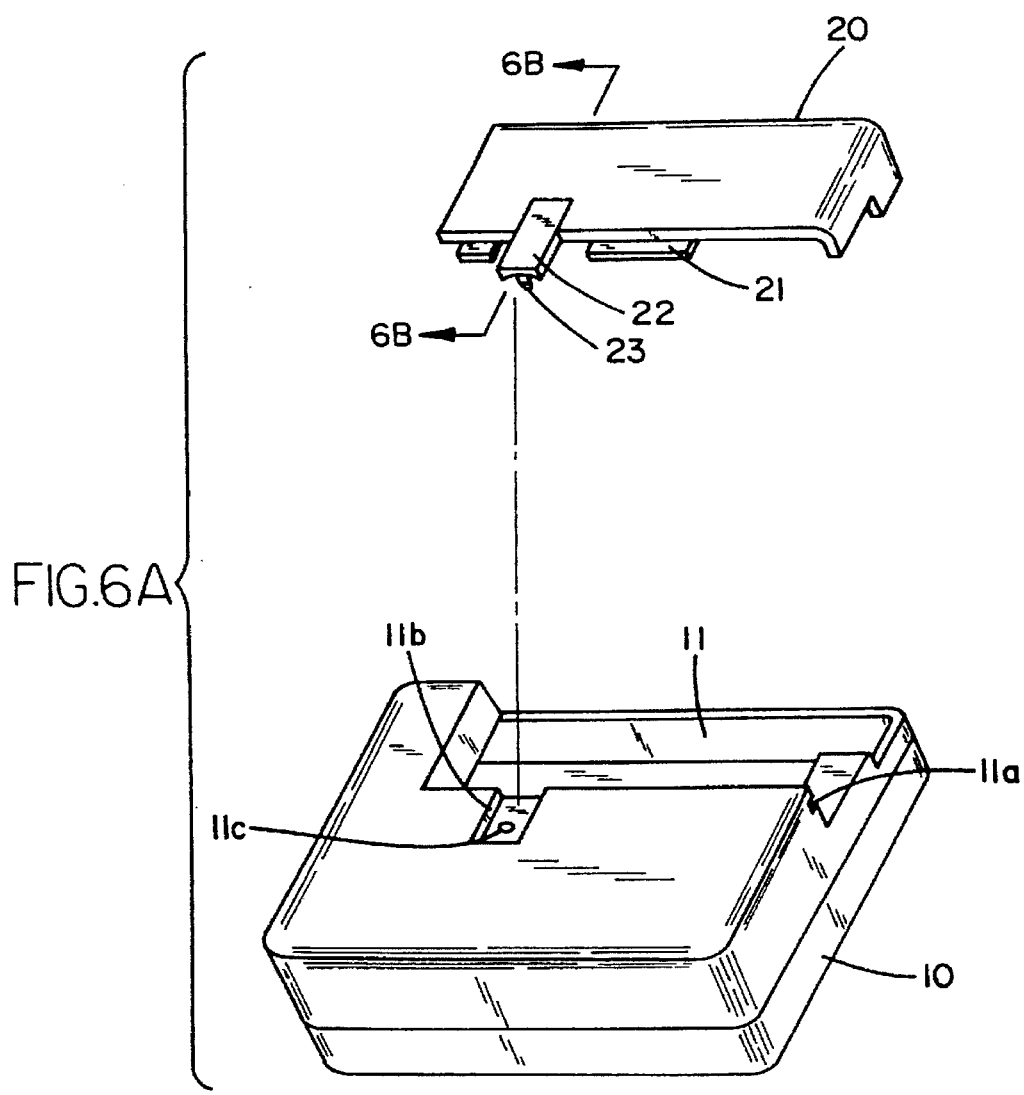
FIG. 6A is a perspective view showing an electronic apparatus according to a second embodiment of the invention.
Figure 6B:
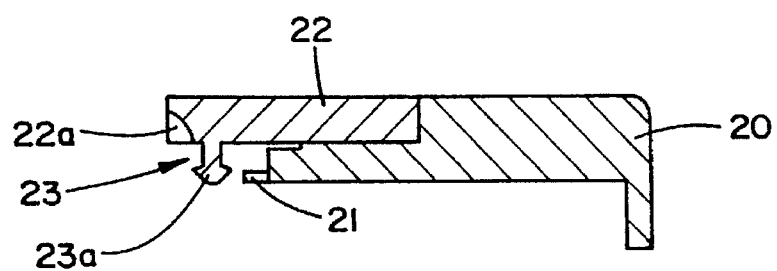
FIG. 6B is a sectional view taken along line D—D in FIG. 6A.
Figure 7A:
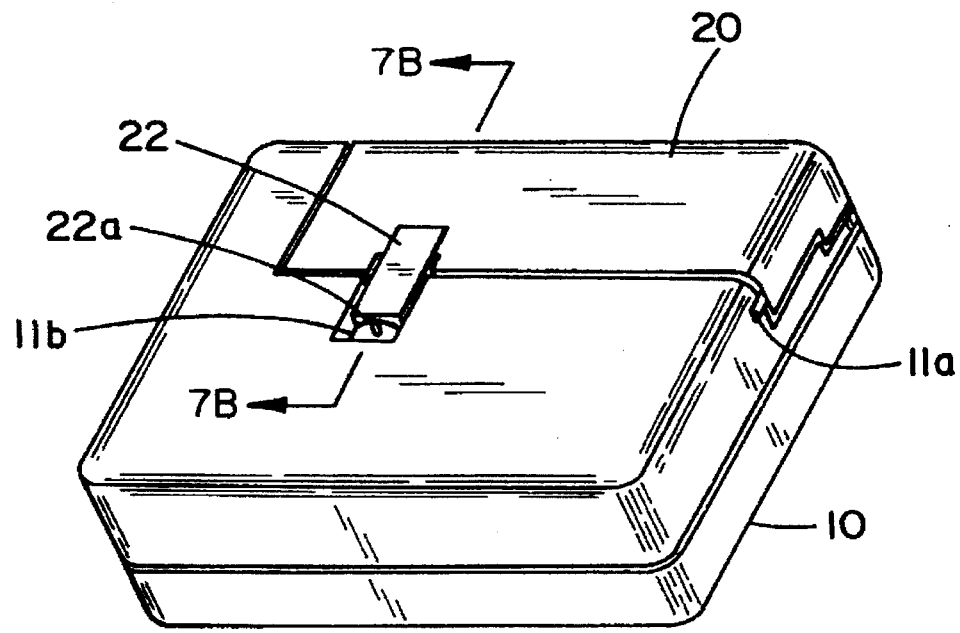
FIG. 7A is a perspective view showing the electronic apparatus in a state where it is fitted with the cell cover.
Figure 7B:
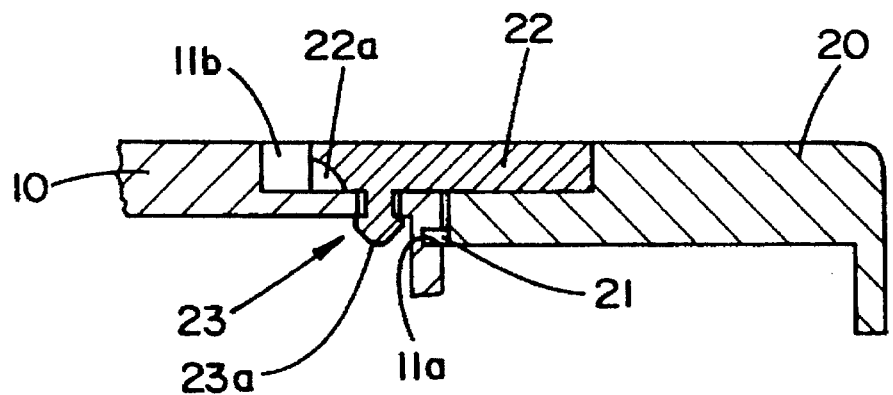
FIG. 7B is a sectional view taken along line E—E in FIG. 7A.

FIG. 6A is a perspective view showing an electronic apparatus according to a second embodiment of the invention, and FIG. 6B is a sectional view taken along line D—D in FIG. 6A. And FIG. 7A is a perspective view showing the electronic apparatus in a state where it is fitted with the cell cover, and FIG. 7B is a sectional view taken along line E—E in FIG. 7A.

As shown in these figures, an electronic apparatus of this embodiment is composed so as to form a projection 23 on the reverse side of the free end of the locking plate 22 and a hole 11c, into which the projection 23 is inserted, in the engaging hollow 11b of the case 10.

In this case, a swollen part 23a is formed at the front end of the projection 23, and this swollen part 23a can be pressed into the hole 11c by a certain pressing force (see FIG. 7B) and can be pulled out from the hole 11c by a certain tensile force.

According to such a construction as this, by pressing the projection 23 into the hole 11c, the locking plate 22 and the engaging hollow 11b can be more firmly engaged with each other and the cell cover can be more securely locked.

However, an electronic apparatus of the invention is not limited to the above-mentioned embodiments. For example, shape and arrangement of the case 10, the cell storing part 11, and the cell cover 20 and the like can be modified without limiting them to the drawings.

And in the above-mentioned embodiments, the locking plate 22 is formed out of an elastomer resin, but the locking plate 22 can be formed out of any other material than an elastomer resin only if it is a material having a moderate hardness, a moderate elasticity, and a restoring capability.

Furthermore, the cell cover 20 may be locked with plural locking plates 22.

What is claimed is:

1. An electronic apparatus, comprising;

a case having an electric cell storing part and having an engaging groove formed in a side wall of an opening of said electric cell storing part as well as an engaging hollow formed near said opening;

a cell cover having an engaging claw for engaging with said engaging groove of said electric cell storing part; and a locking plate which is a flexible plate-shaped member, is fixed to said cell cover in its one end and is made free in the other end, and whose said free end is engaged with said engaging hollow when said cell cover is fitted onto said electric cell storing part.

2. An electronic apparatus as defined in claim 1, wherein said locking plate is formed out of an elastomer resin.

3. An electronic apparatus as defined in claim 1, wherein an hollow is formed in the reverse side of the free end of said locking plate.

4. An electronic apparatus as defined in claim 1, wherein a projection is formed in the reverse side of the free end of said locking plate and a hole into which said projection can be inserted is formed in said engaging hollow of said case.

\* \* \* \* \*

UNITED STATES PATENT AND TRADEMARK OFFICE
CERTIFICATE OF CORRECTION

PATENT NO. : 5,639,570

DATED : June 17, 1997

INVENTOR(S) : Toshiyuki Tamaru

It is certified that error appears in the above-identified patent and that said Letters Patent is hereby corrected as shown below:

Column 2, line 3: "A-A" should read -- 2-2 --

Column 2, line 9: "B-B" should read --4B-4B--

Column 2, line 14: "C-C" should read --5B-5B--

Column 2, line 19: "D-D" should read --6B-6B--

Column 2, line 23: "E-E" should read --7B-7B--

Column 3, line 13: "B-B" should read --4B-4B--

Column 3, line 16: "C-C" should read --5B-5B--

Column 4, line 4: "D-D" should read --6B-6B--

UNITED STATES PATENT AND TRADEMARK OFFICE
CERTIFICATE OF CORRECTION

PATENT NO. : 5,639,570
DATED : June 17, 1997
INVENTOR(S) : Toshiyuki Tamaru

It is certified that error appears in the above-identified patent and that said Letters Patent is hereby corrected as shown below:

Column 4, line 7: "E-E" should read -- 7B-7B --

Signed and Sealed this

Second Day of March, 1999

Attest:

Q. TODD DICKINSON

Attesting Officer

Acting Commissioner of Patents and Trademarks